(12) United States Patent
Herdel et al.

(10) Patent No.: US 12,496,757 B2
(45) Date of Patent: Dec. 16, 2025

(54) INJECTION MOLD

(71) Applicant: Otto Männer GmbH, Bahlingen a.K. (DE)

(72) Inventors: Marco Herdel, Ihringen (DE); Patrick Kern, Endingen (DE); Klaus Bohn, Tenningen-Nimburg (DE); Marcus Birmelin, Endingen (DE)

(73) Assignee: OTTO MÄNNER GMBH, Bahlingen A.K. (DE)

( * ) Notice: Subject to any disclaimer, the term of this patent is extended or adjusted under 35 U.S.C. 154(b) by 221 days.

(21) Appl. No.: 18/252,667

(22) PCT Filed: Nov. 10, 2021

(86) PCT No.: PCT/EP2021/081300
§ 371 (c)(1),
(2) Date: May 11, 2023

(87) PCT Pub. No.: WO2022/106285
PCT Pub. Date: May 27, 2022

(65) Prior Publication Data
US 2024/0009903 A1      Jan. 11, 2024

(30) Foreign Application Priority Data
Nov. 20, 2020   (DE) .................. 102020130768.3

(51) Int. Cl.
*B29C 45/26*   (2006.01)
*B29C 45/73*   (2006.01)

(52) U.S. Cl.
CPC .......... *B29C 45/2673* (2013.01); *B29C 45/73* (2013.01); *B29C 2945/76006* (2013.01);
(Continued)

(58) Field of Classification Search
CPC ................ B29C 45/26; B29C 45/2673; B29C 2045/2687; B29C 45/73
See application file for complete search history.

(56) References Cited

U.S. PATENT DOCUMENTS

| 4,867,668 A | 9/1989 | Miyairi |
|---|---|---|
| 5,261,806 A | 11/1993 | Pleasant |

(Continued)

FOREIGN PATENT DOCUMENTS

| CN | 111300756 A | 6/2020 |
|---|---|---|
| DE | 3716796 A1 | 11/1987 |

OTHER PUBLICATIONS

Kistler, "Werkzeuginnendrucksensor in Einbauhülse mit Front: O 4 mm", Jan. 1, 2005, http://www.kistler.com/mediaaccess/6155AE_000-510d-01.05.pdf.

(Continued)

*Primary Examiner* — Yunju Kim
(74) *Attorney, Agent, or Firm* — CANTOR COLBURN LLP

(57) ABSTRACT

An injection mold comprising a first mold half and a second mold half which during operation are displaceable with respect to each other in a first direction between an open position and a closed position in which the first mold half and the second mold half interact with each other. The first mold half comprises a cavity plate with a front face with a recess in which at least one cavity block comprising at least one first cavity half is arranged forming in a closed position of the injection mold with a corresponding second cavity half arranged at the second mold half a cavity suitable to receive plasticized plastic material to form a part therefrom. At least one cable interconnects the at least one cavity block in a mounted position with a connection box.

13 Claims, 4 Drawing Sheets

(52) U.S. Cl.
CPC ............... *B29C 2945/7604* (2013.01); *B29C 2945/76083* (2013.01); *B29C 2945/7626* (2013.01)

(56) References Cited

U.S. PATENT DOCUMENTS

| | | | |
|---|---|---|---|
| 6,212,963 B1 | 4/2001 | Bader et al. | |
| 6,256,881 B1 | 7/2001 | Starkey | |
| 8,281,664 B2 | 10/2012 | Waser et al. | |
| 8,613,613 B2 | 12/2013 | Gaiser | |
| 2007/0092595 A1 | 4/2007 | Yoshino et al. | |
| 2010/0183762 A1* | 7/2010 | Babin | B29C 45/27 425/569 |
| 2017/0050360 A1 | 2/2017 | Lehmann | |
| 2017/0182691 A1* | 6/2017 | Spuller | B29C 45/74 |

OTHER PUBLICATIONS

International Search Report issued Jan. 22, 2022 in connection with PCT International Application No. PCT/EP2021/081300.

Written Opinion of the International Searching Authority issued Jan. 22, 2022 in connection with PCT International Application No. PCT/EP2021/081300.

Jun. 22, 2021 First Office Action issued in connection with German Patent Application No. 102020130768.3.

Anonymous: "#123 Removable insert | Technical Tutorial—MISUMI", May 18, 2012, pp. 1-1, XP093216208, Retrieved from the Internet: URL:https://www.misumi-techcentral.com/tt/en/mold/2012/05/123-removable-instert.html.

European Office Action for European Application No. 21814701.5; Report Mail Date Oct. 24, 2024 (6 Pages).

\* cited by examiner

INJECTION MOLD

CROSS-REFERENCE TO RELATED APPLICATIONS

This application is a U.S. national stage entry under 35 U.S.C. § 371 of PCT International Patent Application No. PCT/EP2021/081300, filed Nov. 10, 2021, which claims priority to Germany Patent Application No. 102020130768.3, filed Nov. 20, 2020, the contents of each of which are incorporated herein by reference in their entirety.

FIELD OF THE DISCLOSURE

The present disclosure is directed towards the field of injection molds for injection molding of plastics and other thermoplastic materials. More particularly it is directed towards an injection mold comprising a cavity block.

BACKGROUND OF THE DISCLOSURE

From the prior art injection molds comprising two mold halves are known, which are during operation mounted to an injection molding machine.

DE29902185U1 published in June 1999 in the name of Braun Formenbau GmbH relates to an injection mold with a heatable feed channel arranged in a tool body for feeding hot plastic into a mold cavity. The feed channel is formed by a nozzle tip which is separate from the tool body and is inserted into the tool body.

WO2012115614 published in January 2011 in the name of Husky injection molding relates to a side gate nozzle assembly having a nozzle body and at least one side gate nozzle tip assembly wherein the nozzle body and the at least one side gate nozzle tip assembly are slidably engaged to each other.

US20170182691 published in June 2017 in the name of Otto Manner Innovation GmbH relates to an injection mold having a cavity block designed to retain at least one mold cavity insert and the nozzle tip housing.

SUMMARY OF THE DISCLOSURE

As mentioned above, injection molds comprising two mold halves are known. Good results can be achieved, when an injection mold comprises a kind of modular cavity blocks which can be easily exchanged and which will be described hereinafter in more detail. Using cavity blocks allows a flexible set up of the injection mold. The cavity block may comprise parts, such as heating elements requiring a connection to the outside of the injection mold e.g. via a connection box providing a common interface to the outside. One aspect of the disclosure is to provide an injection mold that allows an operation of the injection mold with minimal downtime in case maintenance is required, e.g. for replacing a faulty cavity block.

The disclosure is directed towards an injection mold comprising a first mold half and a second mold half. During operation, the first mold half and the second mold half are usually displaceable with respect to each other in a first direction between an open position and a closed position. In the closed position, the first mold half and the second mold half interact with each other. During operation, the first mold half and the second mold half are usually attached to and arranged in an injection molding machine. In a preferred variation, the first mold half comprises a cavity plate with a front face with a recess in which at least one cavity block is arranged. The at least one cavity block comprises at least one first cavity half forming in a closed position of the injection mold with a corresponding second cavity half arranged at the second mold half a cavity suitable to receive plasticized plastic material to form a plastic part (e.g. a pipette) therein. The front face of the first mold half faces the second mold half. If appropriate the cavity block can form part of the front face of the first mold half.

At least one cable interconnects the at least one cavity block in a mounted position with a connection box. Typically, the cavity block comprises components requiring a cable connection to the outside of the injection mold, in particular via the connection box. These components can be at least one out of the following or a combination thereof, heating elements or sensors or the like. In particular, the sensors can be temperature sensors and/or pressure sensors and/or position detection sensors configured to measure the position of movable parts of the cavity block.

The at least one cable can be an electrical cable and/or an optical cable or a combination or a bundle thereof. Depending on the field of application, the cable may be formed as a pipe or a fluid cable, in particular for air, interconnected to a connection box and/or an air gap detection sensor connected to a connection box. Fluid cables can form part of a leakage detection system. In injection mold can comprise one or more connection boxes, in particular at least one connection box for electrical cables and at least one connection box for fluid cables.

For efficient maintenance at least one cavity block can be arranged in a removable manner in the front face of the cavity plate. This allows a removal and/or insertion of the cavity block in the open position of the injection mold while the injection mold is attached to an injection molding machine.

During assembly of the injection mold the at least one cavity block can be inserted into the recess of the front face. A cable connection between the cavity block and the connection box can be made with the cable. Preferably a cable conduit extends in the first mold half suitable to receive at least one cable of at least one cavity block. The cable conduit may extend at least partially in the front face of the cavity plate. In some variations the cable conduit can at least partially be formed as a notch at least partially extending at the edge of the recess. The cable conduit may extend at least partially adjacent to and/or in a boundary surface extending between the cavity plate and the therein arranged at least one cavity block. If appropriate a cover for the cable conduit may be arranged at the front face at least partially covering the cable conduit for protecting the cable arranged therein.

Good results are possible when the cable ends in a first connector part by which it is interconnected to a respective second connector part of the connection box. Alternatively, or in addition, the cable ends in a third connector part by which it is interconnected to a respective fourth connector part of the cavity block. Preferably the first connector part is formed as a plug and the second connector part is formed as a socket, however other connector parts are possible like crimp-on connectors etc. This allows a quick connection and disconnection between the cable and the connection box.

Preferably several cavity blocks are arranged independently removable from each other. Preferably the at least two cavity blocks are of essentially the same spatial dimensions, however differently sized cavity blocks are possible as well. Depending on the design the cavity blocks can be arranged in a recess per cavity block and/or in a recess accommodating two or more cavity blocks. In some variations with a recess accommodating two or more cavity blocks at least two cavity blocks can be arranged adjacent to each other. Preferably the cavity blocks are arranged in a grid-like manner forming at least one row and at least one column.

A secure arrangement of the cavity block is possible when it has a polygonal cross-section, however a round or circular cross-section or a combination thereof are also thinkable. A compact construction of the injection mold can be achieved when the at least one cavity block has an essentially rectangular cross-section, in particular a square-shaped cross-section. Square-shaped cavity blocks can be easily arranged adjacent to each other in a grid-like manner.

The at least one cavity block is preferably attached to a back face of the recess, in particular by means of bolts. Preferably the back face can be essentially planar, such that a common surface for attachment is provided, however differently shaped back faces are thinkable, such as stepped back faces. Alternatively, or in addition, the cavity block can be attached to a side wall of the recess. The side wall of the recess may comprise at least one indentation extending in the first direction and forming part of the cable conduit for routing the cable along a side face of the cavity block. Two edge regions of the indentation may support the cavity block perpendicular to the first direction against misalignment during assembly and/or operation. The at least one indentation preferably has a U-shaped cross-section. If appropriate the cavity block may comprise alignment means arranged at a bottom face and/or at a side face of the cavity block engaging during insertion and/or during operation with the back face and/or the side wall of the recess. The alignment means can be formed as pins or flat-sided sliders or tongues or grooves or a combination thereof. In the assembled state the bottom face of the cavity block may face the back face of the recess.

For good thermal regulation the cavity block may comprise a cooling channel which is interconnected to a respective cooling channel in the cavity plate. Preferably the cavity block further comprises at least one inlet and at least one outlet for connecting the cavity block to the cooling channel in the cavity plate. If appropriate at least one inlet and at least one outlet can be of a quick coupling type. An efficient removal of the cavity block is possible when the inlet and outlet of the cavity block and the cavity plate respectively are of a self-closing type, such that in case of a disconnection the inlet and outlet self-close to avoid undesired leakage. This has the advantage, that the blowing empty of the cooling channels can be omitted. Preferably the at least one inlet and the at least one outlet of the cavity block and/or the at least one inlet and the at least one outlet of the cavity plate can be displaceable in a lateral direction (perpendicular to the first direction), in order to compensate a misalignment of the cavity block with respect to the at least one inlet and the at least one outlet of the cavity plate. The at least one inlet and at least one outlet can be arranged at the bottom face of the cavity block connected to corresponding inlet and outlets of the respective cooling channel in the back face in the recess. However, it is thinkable that the at least one inlet and at least one outlet can be arranged at a side face of the cavity block connected to corresponding inlet and outlets of the respective cooling channel in the cavity plate.

In some variations the cavity block may comprise at least one center opening for receiving at least one snorkel supplying melted plastic material to the cavity during operation to form plastic parts. Depending on the field of application the cavity block may comprise two or more cavities, which are in particular arranged with respect to the center opening in a symmetrical manner.

A good accessibility for maintenance of the cavity block is possible when the cable is attached to the cavity block at a side face of the cavity block. Preferably the cavity block comprises a cable channel extending between the center opening and the side face of the cavity block. In some variations the cable channel is formed as a groove in the bottom face of the cavity block. A spatial separation of the cable attached the side of the cavity block and the connections to the cooling channel in the cavity plate is desirable to minimize the risk of interference of the two during assembly/disassembly.

For preventing undesired forces on the cable entering the cavity block a cable clamping means can be attached to the cavity block. Depending on the design the cable clamping means may be integrated into the cavity block. Preferably the cable clamping means are formed as a separate part attached to the side face of the cavity block. The clamping means may comprise a groove facing the side face of the cavity block for guiding and/or clamping the cable therein. In the assembled state the clamping means attached to the side face can be accommodated in the indentation of the side wall of the recess.

The connection box can be arranged along a side face of the first mold half, in particular on at least one side face of the cavity plate. In other words, the connection box can be arranged on the outside first mold half, however incorporating the connection box at least partially into the first cavity plate is possible as well.

Depending on the field of application, the cavity plate may comprise a first layer and a second layer. The first layer and the second layer can be stacked in the first direction. The first layer is preferably a circumferential frame which encompasses the at least one cavity block at least partially. The second layer may form at least part of the back face of the recess. If appropriate the cooling channel can be arranged in the second layer of the cavity plate.

Depending on the design, the first mold half may comprise at least one snorkel for supplying melted plastic material to the at least one cavity block. Preferably the snorkel is arranged in the second layer of the first mold half extending in the assembled state through the back face into the at least one cavity block. In some variations the first mold half comprises a hot runner manifold for distributing melted material to the at least one snorkel.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the disclosure described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
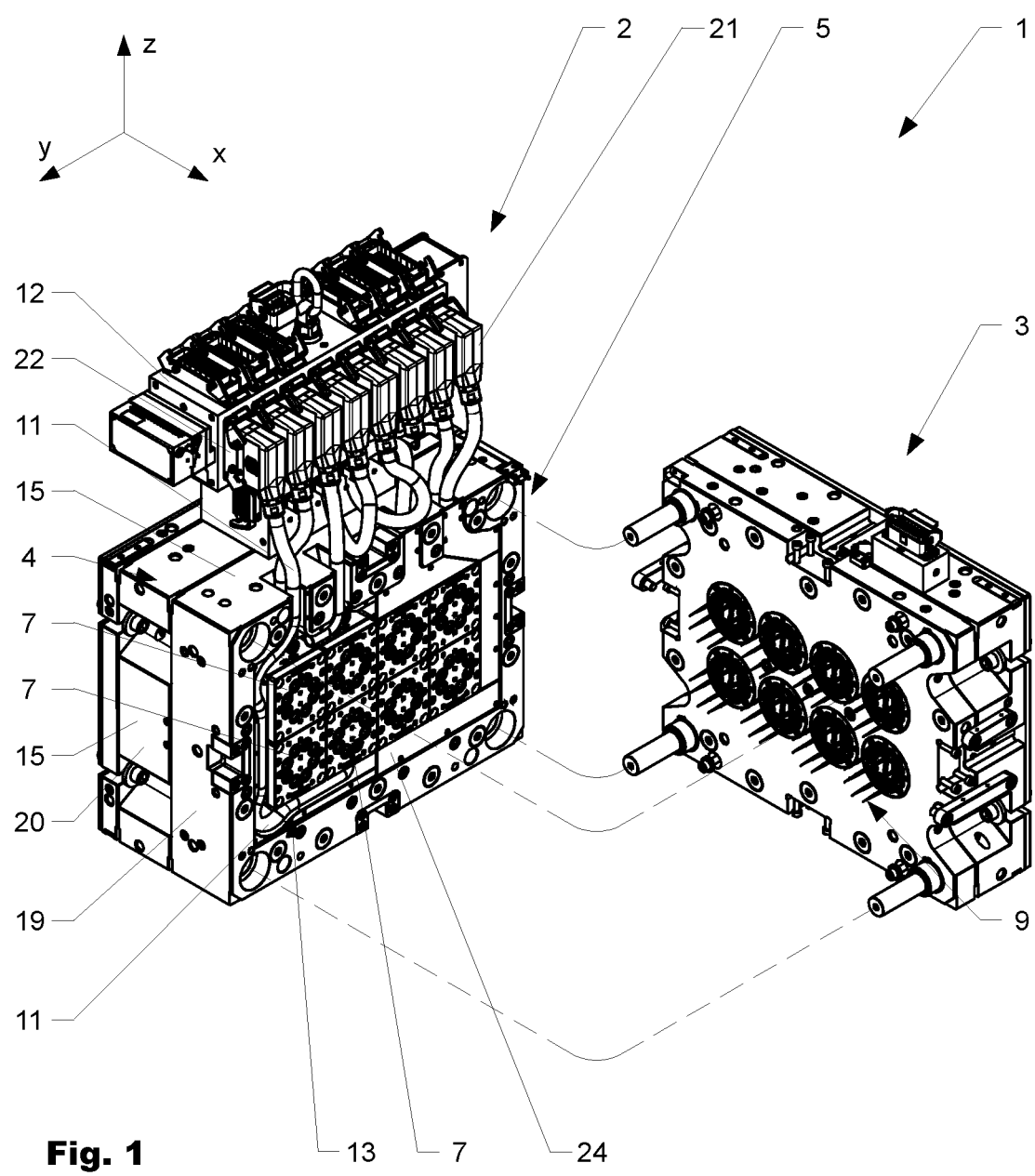
FIG. 1 a first variation of the injection mold according to the disclosure.
Figure 2:
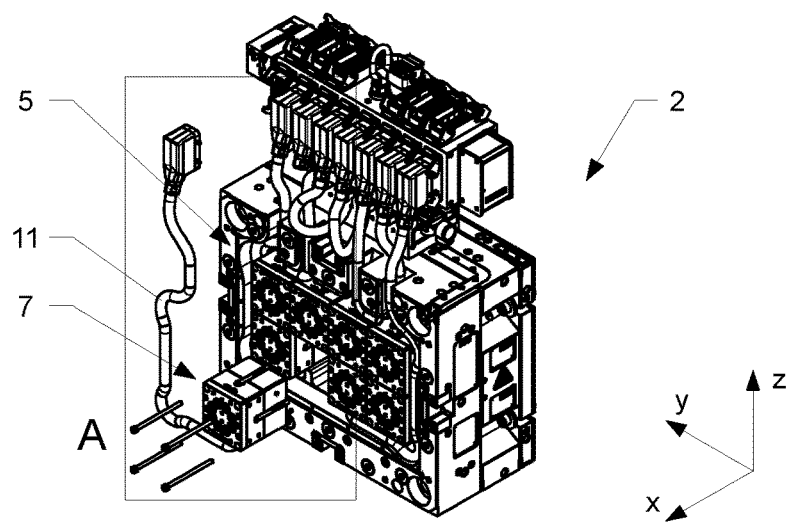
FIG. 2 the first mold half of the first variation in a partially exploded view.
Figure 3:
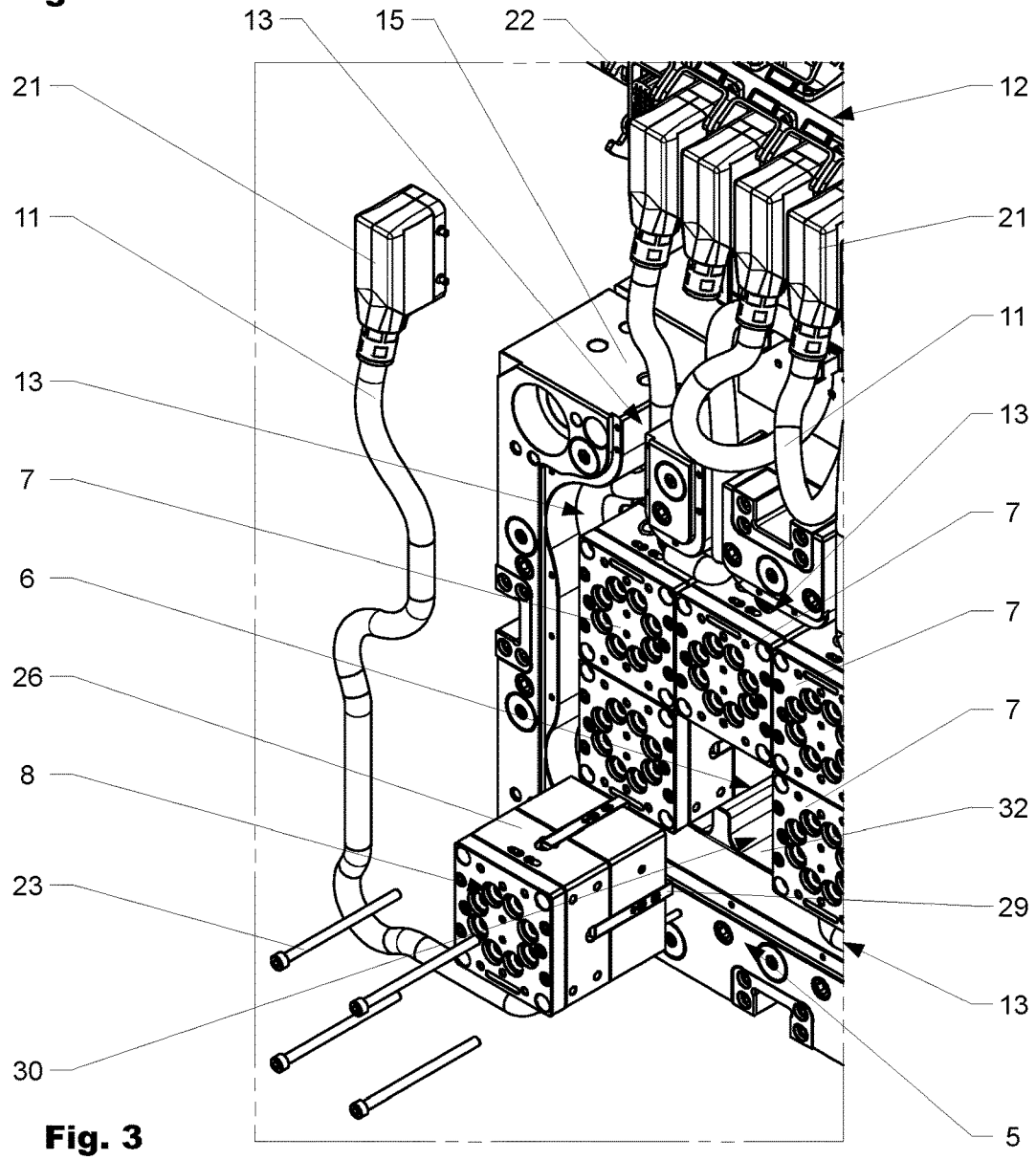
FIG. 3 a detailed view of the first mold of FIG. 2.
Figure 4:
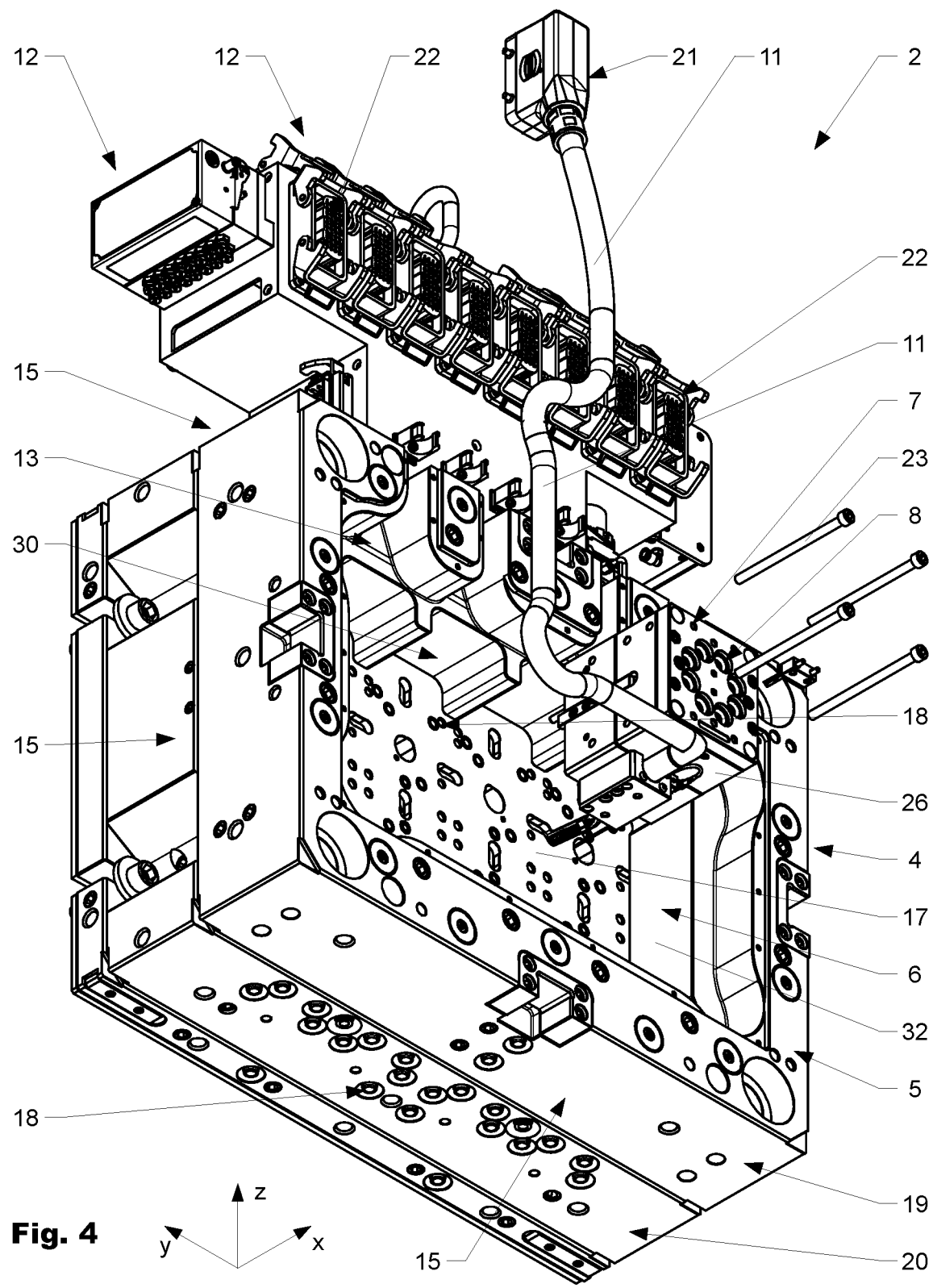
FIG. 4 the first mold half of the first variation in a partially exploded view.
Figure 5:
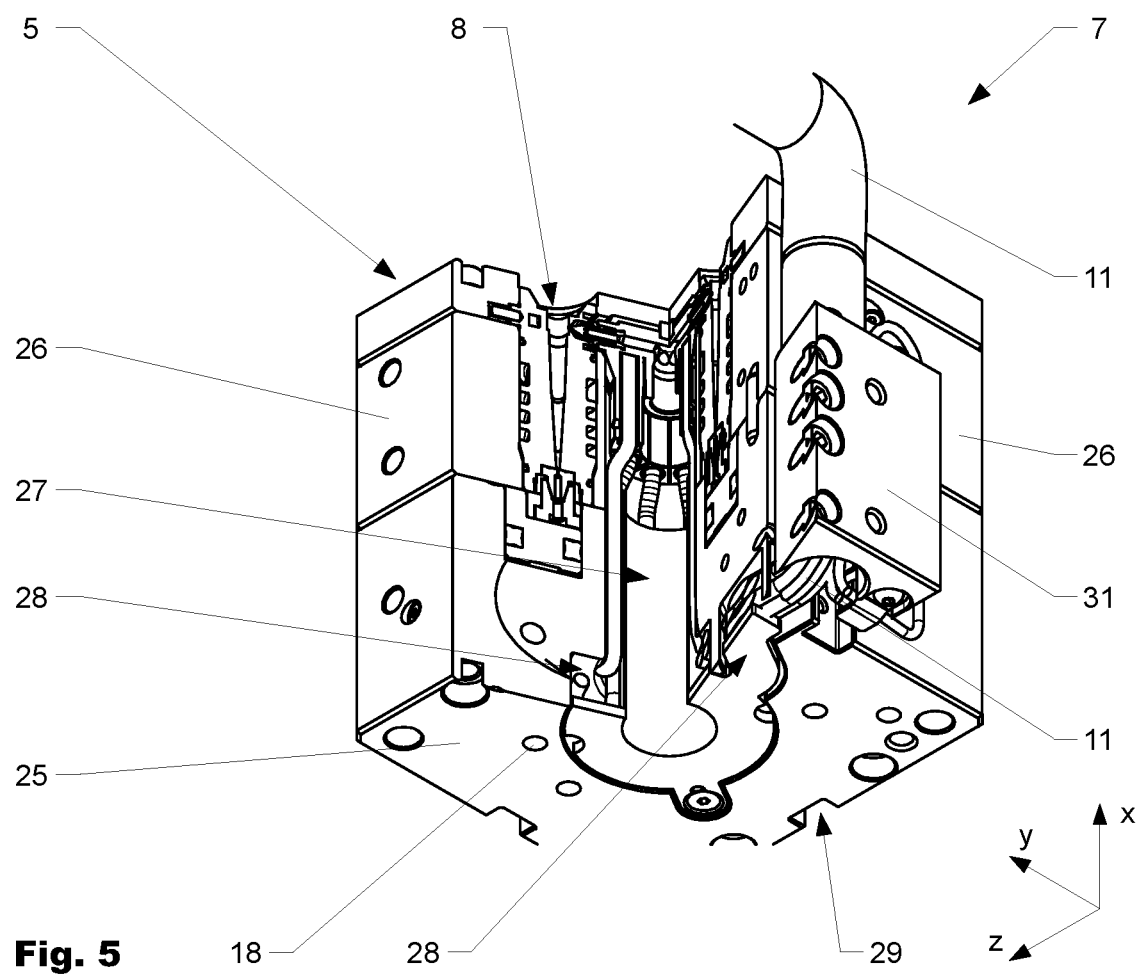
FIG. 5 a cavity block of the first variation in a partially sectioned view.

FIG. 1 shows a first variation of the injection mold 1 according to the disclosure. FIG. 2 shows a first mold half 2 of the injection mold 1 in a partially exploded view and FIG. 3 shows a magnified view of detail A of FIG. 2. FIG. 4 shows the same first mold half of the first variation of FIGS. 2 and 3 in a partially exploded view form a different viewing angle. FIG. 5 shows a cavity block 7 of the first variation in a partially sectioned view. The injection mold 1 shown in the drawings comprises a first mold half 2 and a second mold half 3 which are during operation displaceable with respect to each other in a first direction x between an open position and a closed position. During operation, the first mold half 2 and the second mold half 3 are usually arranged in an injection molding machine (not shown).

In FIG. 1, the second mold half 3 is shown spaced apart and pivoted away (indicated by dashed lines) from the first mold half 2 to enable a better view of the first and the second mold halves 2, 3. The first mold half 2 comprises a cavity plate 4 with a front face 5 with a recess 6 in which at least one cavity block 7 is arranged. In the shown variation the recess 6, best visible in FIG. 4, accommodates eight cavity blocks 7 arranged adjacent to each other in a grid-like manner forming two rows and four columns. As shown, per cavity block 7 at least one cable 11 interconnects the cavity block 7 in a mounted position with a connection box 12, as shown in FIGS. 1 to 3. The cables 11 in the shown variation are electrical cables for supplying heating elements and connecting sensors. However, the same cable 11 or a different cable may comprise other types of connection means such as one or several tubes for conducting fluid, preferably cooling fluid and/or fluid to detect leakage and/or one or several optical fibers for data exchange. Alternatively, or in addition, the same or a different cable can be connected to the same connection box 12 and/or a different connection box. In the shown variation, the cables 11 are arranged in a same or different cable conduits 13 extending at least partially in the first mold half 2. If appropriate, as visible in FIG. 1 the cable conduit 13 may at least partially be covered by a cover 24. As illustrated in FIGS. 3 and 4 the cable conduit 13 extends at least partially in the front face 5 of the cavity plate 4 and is formed as a notch extending at least partially along an edge of the recess 6 adjacent to the front face 5. The cable conduit 13 essentially surrounds the recess 6 and the cavity blocks 7 therein. In a transition region, the cable conduit 13 passes through the cavity plate 4 to a side face 15 of the first mold half 2 where the connection box 12 is arranged to which it is interconnected. As best visible in FIG. 4 the cable 11 ends in a first connector part 21 formed as a plug by which it is interconnected to a respective second connector part 22 of the connection box formed as a socket.

By this the connection between the cavity block 7 and the connection box 12 is effortlessly possible. In the shown variation, each cavity block 7 comprises at least one first cavity half 8, as shown in FIG. 5, forming in a closed position of the injection mold 1 with a corresponding second cavity half 9 arranged at the second mold half 3, as shown in FIG. 1, a cavity suitable to receive plasticized plastic material to form a part therein. On advantage is that the cavity blocks 7 are independently from each other removable from the first mold half 2 by loosening the bolts 23 holding the cavity block 7 in place. Once the bolts 23 are removed the cavity block 7 can be pulled out of the recess 6 in the first direction x, as best visible in FIG. 3. The cavity blocks 7 have in the first variation a rectangular cross-section. As can be seen in FIG. 5 the cavity block 7 has a bottom face, which faces when inserted into the recess 6 the back face of the recess 6. In the bottom face 25 of the cavity block 7 inlets and outlets are arranged, which connect to corresponding inlet and outlets of the respective cooling channel 18 in the back face 17 in the recess 6. FIG. 5 further shows a cable channel 28 extending between a center opening 27 of the cavity block 7 to a side face 26 of the cavity block 7. The cable channel 28 is formed as a groove in the bottom face 25 of the cavity block 7. FIG. 4 shows a multipart construction of the cavity plate, which comprises a first layer 19 and a second layer 20. The first layer 19 and the second layer 20 arranged in a stacked manner in the first direction x. The first layer 19 is in the shown variation formed as a circumferential frame which encompasses the cavity blocks 7. The second layer 20 forms the back face 17 of the recess 6 and comprises cooling channels 18 connected in the assembled state of the injection mold 1 to the cavity blocks 7 respectively. As shown in FIG. 3 the cavity block 7 of the shown variation, may comprises alignment means 29 arranged at the side face 26 of the cavity block 7 engaging during insertion and/or during operation with the back face 17 of the recess 6. The alignment means 29 can be flat-sided sliders and grooves arranged at the side face 26 of the cavity block 7. As illustrated in FIGS. 3 and 4, the side wall 32 of the recess 6 comprises here a U-shaped indentation 30 extending in the first direction x and forming part of the cable conduit 13 for routing the cable 11 along a side face 26 of the cavity block. The two edge regions of the indentation support the cavity block 7 perpendicular to the first direction. For preventing undesired forces on the cable 11 inside the cavity block 7 a cable clamping means 31 is attached to the side face 26 of the cavity block 7. In the assembled state the clamping means 31 is accommodated in the indentation 30 of the side wall 32 of the recess 6.

Rather, the words used in the specification are words of description rather than limitation, and it is understood that various changes may be made without departing from the scope of the disclosure.

| LIST OF DESIGNATIONS | |
|---|---|
| 1 | Injection mold |
| 2 | First mold half |
| 3 | Second mold half |
| 4 | Cavity plate |
| 5 | Front face (cavity plate) |
| 6 | Recess (front face) |
| 7 | Cavity block (first mold half) |
| 8 | First cavity half (cavity block, first mold half) |
| 9 | Second cavity half (second mold half) |

LIST OF DESIGNATIONS

| | |
|---|---|
| 11 | Cable |
| 12 | Connection box |
| 13 | Cable conduit |
| 15 | Side face (first mold half) |
| 17 | Back face (recess) |
| 18 | Cooling channel (cavity block) |
| 19 | First layer (cavity plate) |
| 20 | Second layer (cavity plate) |
| 21 | First connector part (Plug) |
| 22 | Second connector part (socket) |
| 23 | Bolt (cavity block) |
| 24 | Cover (cable conduit) |
| 25 | Bottom face (cavity block) |
| 26 | Side face (cavity block) |
| 27 | Center opening (cavity block) |
| 28 | Cable channel (cavity block) |
| 29 | Alignment means (cavity block) |
| 30 | Indentation (side wall of recess/cable conduit) |
| 31 | Cable clamping means |
| 32 | Side wall (recess) |

The invention claimed is:

1. An injection mold comprising a first mold half and a second mold half which during operation are displaceable with respect to each other in a first direction between an open position and a closed position in which the first mold half and the second mold half interact with each other; wherein
   a. the first mold half comprises a cavity plate with a front face with a recess in which at least one cavity block comprising at least one first cavity half is arranged forming in a closed position of the injection mold with a corresponding second cavity half arranged at the second mold half a cavity suitable to receive plasticized plastic material to form a part therefrom; wherein
   b. at least one cable interconnects the at least one cavity block in a mounted position with a connection box;
   c. wherein a cable conduit extends in the first mold half suitable to receive at least one cable of at least one cavity block, wherein the cable conduit extends at least partially in the front face of the cavity plate.

2. The injection mold according to claim 1, wherein the at least one cavity block is arranged in a removable manner in the front face of the cavity plate.

3. The injection mold according to claim 2, wherein the several cavity blocks are arranged independently removable from each other.

4. The injection mold according to claim 1, wherein the cable ends in a first connector part by which it is interconnected to a respective second connector part of the connection box.

5. The injection mold according to claim 1, wherein the cable conduit extends at least partially adjacent to and/or in a boundary surface extending between the cavity plate and the therein arranged at least one cavity block.

6. The injection mold according to claim 1, wherein the at least two cavity blocks are arranged adjacent to each other.

7. The injection mold according to claim 1, wherein the cavity blocks are arranged in a grid-like manner forming at least one row and at least one column.

8. The injection mold according to claim 1, wherein the at least one cavity block has an essentially rectangular cross-section.

9. The injection mold according to claim 1, wherein the connection box is arranged along a side face of the first mold half.

10. The injection mold according to claim 1, wherein the cable is attached to the cavity block at a side face of the cavity block.

11. The injection mold according to claim 1, wherein the at least one cavity block is attached to a back face of the recess.

12. The injection mold according to claim 11, wherein the cavity block comprises a cooling channel which is interconnected to a respective cooling channel in the cavity plate.

13. The injection mold according to claim 1, wherein the cavity plate comprises a first layer and a second layer, wherein the first layer is a circumferential frame which encompasses the at least one cavity block at least partially.

* * * * *